US010049446B2

(12) United States Patent
Simon (10) Patent No.: US 10,049,446 B2
(45) Date of Patent: Aug. 14, 2018

(54) ACCELERATED STATISTICAL ITERATIVE RECONSTRUCTION

(71) Applicant: Carestream Health, Inc., Rochester, NY (US)

(72) Inventor: Richard A. Simon, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 207 days.

(21) Appl. No.: 14/973,964

(22) Filed: Dec. 18, 2015

(65) Prior Publication Data

US 2017/0178316 A1 Jun. 22, 2017

(51) Int. Cl.
*G06T 7/00* (2017.01)
*G06T 11/00* (2006.01)
*G06T 5/00* (2006.01)
*G06T 19/00* (2011.01)

(52) U.S. Cl.
CPC ............. *G06T 7/0012* (2013.01); *G06T 5/00* (2013.01); *G06T 11/008* (2013.01); *G06T 19/00* (2013.01); *G06T 2207/10072* (2013.01); *G06T 2207/10116* (2013.01); *G06T 2207/30004* (2013.01); *G06T 2210/41* (2013.01)

(58) Field of Classification Search
CPC ..... G06T 7/0012; G06T 19/00; G06T 11/008; G06T 5/00; G06T 2210/41; G06T 2207/30004; G06T 2207/10072; G06T 2207/10116

USPC ........................................................ 382/131
See application file for complete search history.

(56) References Cited

U.S. PATENT DOCUMENTS

| 8,189,735 B2 | 5/2012 | Khare et al. |
| 8,811,700 B2 | 8/2014 | Wang et al. |
| 2011/0164031 A1 | 7/2011 | Shi |
| 2014/0153803 A1* | 6/2014 | Noda ............... G06T 7/0012 382/131 |
| 2014/0369580 A1 | 12/2014 | Yu et al. |
| 2015/0086097 A1* | 3/2015 | Chen ............... G06T 11/008 382/131 |

OTHER PUBLICATIONS

Michal Aharon et al., "K-SVD: An Algorithm for Designing Overcomplete Dictionaries for Sparse Representation," IEEE Transactions on Signal Processing, vol. 54, No. 11, Nov. 2006, pp. 4311-4322.
Abolfazi Mehranian et al., "An ordered-subsets proximal preconditioned gradient algorithm for edge-preserving PET image reconstruction," Med. Phys. 40 (5), May 2013, pp. 052503-1-052503-14.
(Continued)

*Primary Examiner* — Amandeep Saini (57) ABSTRACT

A method for reconstructing a volume image of a subject, executed at least in part by a computer, accesses projection x-ray images of the subject and performs a volume image reconstruction using the x-ray images by iteratively performing alternating steps of a tomographic update, where a gradient based algorithm having a preconditioner is used to update the volume image reconstruction and a spatially varying denoising that is a function of the preconditioner. The method displays, stores, or transmits the volume image reconstruction.

20 Claims, 5 Drawing Sheets

(56) References Cited

OTHER PUBLICATIONS

Yongsheng Pan et al., "TV-regularized Iterative Image Reconstruction on a Mobile C-ARM CT," SPIE Proceedings, Medical Imaging, Mar. 2010, pp. 12 pages.

Yonghseng Pan et al., "Feasibility of GPU-assisted iterative image reconstruction for mobile C-arm CT," SPIE Proceedings, Medical Imaging 2009, vol. 7258, pp. 72585J-1-72585J-9.

Emil Y. Sidky et al., "Image reconstruction in circular cone-beam computed tomography by contrained, total-variation minimization," Phys. Med. Biol. 53 (2008), pp. 4777-4807.

* cited by examiner

ACCELERATED STATISTICAL ITERATIVE RECONSTRUCTION

TECHNICAL FIELD

The disclosure relates generally to radiographic imaging systems that generate three-dimensional (3-D) images, and more particularly, to 3-D images reconstructed from a series of two dimensional (2-D) images.

BACKGROUND

Three-dimensional (3-D) radiographic volume imaging is a diagnostic tool that offers advantages over earlier two-dimensional (2-D) radiographic imaging techniques for evaluating the condition of internal structures and organs. 3-D imaging of a patient or other subject has been made possible by a number of advancements, including the development of high-speed imaging detectors, such as digital radiography (DR) detectors that enable multiple images to be taken in rapid succession. To meet various requirements for imaging of different portions of the human anatomy under different conditions, a number of types of radiographic volume imaging apparatus have been developed. These include computed tomography (CT) apparatus such as cone-beam computed tomography (CBCT) systems, as well as others.

Among the challenges addressed by these developing 3-D imaging technologies is the need for improved image reconstruction techniques. In radiographic 3-D imaging systems, a series of 2-D images, taken at different angles with relation to the subject, is processed in order to generate or reconstruct image content in 3-D image space. Conventional reconstruction algorithms used for CBCT and other 3-D imaging systems include analytical techniques such as FDK reconstruction, filtered back projection (FBP), and others.

One type of reconstruction is model based iterative reconstruction (MBIR) technique. MBIR allows the reconstruction logic to take advantage of prior knowledge of the imaged subject and accurate statistical, geometrical, and physical system modeling of the capture process. Iterative reconstruction techniques, based on progressive estimation methods used to address large-scale problems in numerical linear algebra, are computationally intensive. In addition, MBIR techniques allow reconstructions using fewer 2-D projection images and/or reduce the dose per projection, thereby reducing the radiation dose levels for the patient.

MBIR reconstruction employs an objective function with a statistically weighted data fidelity term and an often highly nonlinear regularization/prior knowledge term. In processing, the image is reconstructed by computing an estimate that minimizes the objective function.

Applicants have recognized that MBIR techniques are hampered by their time-consuming and computationally intensive characteristics. For example, convergence speed can be slow when compared against competing analytical reconstruction techniques.

Reference is made to patent literature: U.S. 2014/0369580 (Yu); U.S. 2015/0086097 (Chen); U.S. 2011/0164031 (Shi); and U.S. Pat. No. 8,189,735 (Khare).

Reference is also made to non-patent literature:
(a) Abolfazi Mehranian, Mohammad Reza Ay, Fotis Kotasidis, Habib Zaidi, "An ordered-subsets proximal preconditioned gradient algorithm for edge-preserving PET image reconstruction", Med. Phys. 40(5), May 2013 pp. 052503-1 to -14.
(b) Emil Y. Sidky and Xiaochuan Pan, "Image reconstruction in circular cone-beam computed tomography by constrained, total-variation minimization" Physics in Medicine and Biology 53 (2008) pp. 4777-4807.
(c) Yongsheng Pan, Ross Whitaker, Arvi Cheryauka, Dave Ferguson, "TV-regularized Iterative Image Reconstruction on a Mobile C-ARM CT" SPIE Proceedings, Medical Imaging March 2010 pp 1-12.
(d) Yongsheng Pan, Ross Whitaker, Arvi Cheryauka, Dave Ferguson, "Feasibility of GPU-assisted iterative image reconstruction for mobile C-arm CT" SPIE Proceedings, Medical Imaging 2009, Vol 7258, pp. 72585J-1 to -9.

Applicants have recognized that MBIR reconstruction methods that speed convergence of the iterative processing and that provide improved noise uniformity over conventional methods would be useful for time and cost savings as well as for reduced radiation exposure to the patient.

SUMMARY

It is an object of the present disclosure to advance the art of volume imaging reconstruction for diagnostic imaging and related applications. Embodiments of the present disclosure employ a preconditioner to condition both tomographic update and spatially varying denoising and can provide improved convergence of iterative processing.

These objects are given only by way of illustrative example, and such objects may be exemplary of one or more embodiments of the present disclosure. Other desirable objectives and advantages inherently achieved may become apparent to those skilled in the art. The invention is defined by the appended claims.

According to one aspect of the disclosure, there is provided a method for reconstructing a volume image of a subject, the method executed at least in part by a computer and comprising: accessing a plurality of projection x-ray images of the subject; performing a volume image reconstruction using the plurality of x-ray images by iteratively performing: (1) a tomographic update step, where a gradient based algorithm having a preconditioner is used to update the volume image reconstruction; and (2) a spatially varying denoising step, where a spatially varying denoising algorithm is a function of the preconditioner; and displaying, storing, or transmitting the volume image reconstruction.

BRIEF DESCRIPTION OF THE DRAWINGS

The foregoing and other objects, features, and advantages of the invention will be apparent from the following more particular description of the embodiments of the disclosure, as illustrated in the accompanying drawings. The elements of the drawings are not necessarily to scale relative to each other.

DETAILED DESCRIPTION OF THE EMBODIMENTS

The following is a detailed description of the preferred embodiments, reference being made to the drawings in which the same reference numerals identify the same elements of structure in each of the several figures.

Where they are used, the terms "first", "second", and so on, do not necessarily denote any ordinal or priority relation, but may be used for more clearly distinguishing one element or time interval from another.

The term "exemplary" indicates that the description is used as an example, rather than implying that it is an ideal.

The term "in signal communication" as used in the application means that two or more devices and/or components are capable of communicating with each other via signals that travel over some type of signal path. Signal communication may be wired or wireless. The signals may be communication, power, data, or energy signals which may communicate information, power, and/or energy from a first device and/or component to a second device and/or component along a signal path between the first device and/or component and second device and/or component. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

In the context of the present disclosure, the terms "pixel" and "voxel" may be used interchangeably to describe an individual digital image data element, that is, a single value representing a measured image signal intensity. Conventionally an individual digital image data element is referred to as a voxel for 3-dimensional or volume images and a pixel for 2-dimensional (2-D) images. For the purposes of the description herein, the terms voxel and pixel can generally be considered equivalent, describing an image elemental datum that is capable of having a range of numerical values. Voxels and pixels have attributes of both spatial location and image data code value.

Embodiments of the present disclosure address the need for improved algebraic reconstruction using model-based iterative reconstruction (MBIR) and applying operator splitting techniques that can provide faster processing and improved signal-to-noise ratio in the generated volume image reconstruction. Model based iterative reconstruction (MBIR) algorithms are known to provide superior image structure and can offer potential dose savings compared to analytical reconstruction algorithms (e.g. filtered back projection). However, as noted previously, conventional iterative reconstruction techniques can often be computationally intensive and time consuming. Embodiments of the present disclosure describe a framework for a model based iterative reconstruction that leads to both a more favorable convergence rate and improved noise uniformity in the image reconstruction.

MBIR Overview

A conventional MBIR (Model-Based Iterative Reconstruction) process can be used to perform iterative reconstruction with noise reduction. MBIR algorithms typically work by first forming an objective function Φ that incorporates an accurate system model A, a statistical noise model, and a prior image model, as shown in a form objective function step S100. The image f is reconstructed by computing an estimate $f^*$ that minimizes the objective function Φ(f):

$$\Phi(f) = R(f, \mu(r)) + H(f) \qquad \text{(eqs. 1)}$$

$$f^* = \arg\min_{f>0} \Phi(f)$$

wherein r represents the spatial coordinate (x,y,z); H(f) is the data fidelity term, and R(f) is the regularizer/prior image term. The parameter μ is a scalar that can be a spatially constant or varying parameter that controls the relative effect of the regularizer data and prior term on the final reconstructed image content.

The data fidelity term H(f) encourages the reconstructed object f towards similarity to the original measured noisy projection p data. The regularizer term R(f) constrains the computed reconstruction f to the space defined by the regularizer. The data fidelity term H(f) incorporates a model for the measurement system composed of an accurate system model in a forward projection matrix A; a statistical noise model is incorporated into a statistical weighting matrix W. A common choice for the data fidelity term is in a quadratic form, as follows:

$$H(f) = \frac{1}{2}(Af - p)^T W(Af - p) = \frac{1}{2}\|Af - p\|_W^2 \qquad \text{(eq. 2)}$$

wherein A is an M×N matrix; $p=(p_1, p_1, \ldots p_M)$ is a vector of length M, and $f=(f_1, f_1, \ldots f_N)$ is a vector of length N.

The statistical weighting matrix W in eq. 2 is inversely proportional to the covariances of the measured projection data p. The covariances are related to the captured photon statistics and preprocessing steps such as detector response and normalization, scatter and beam hardening correction, denoising of the measured projections, and the like. If the measurements are independent, the statistical weighting matrix W is a diagonal matrix with diagonal elements $w_i$ given by:

$$w_i = \frac{1}{\sigma^2(p_i)} \qquad \text{(eq. 3)}$$

wherein $\sigma^2(p_i)$ is the variance of ith projection measurement $p_i$. By way of example, the variance for a Poisson measurement process with independent electronic noise is given by:

$$\sigma^2(p_i) = \frac{I_i + \sigma_e^2}{I_i^2} = \frac{1}{I_{i0}}\exp(p_i)\left(1 + \frac{\sigma_e^2}{I_{i0}}\exp(p_i)\right) \qquad \text{(eq. 4)}$$

wherein $I_{i0}$ is the open field intensity; $I_i$ is the intensity of the ith projection measurement; and $p_i=-\log(I_i/I_{i0})$ is the density for the ith ray; and $\sigma_e^2$ is the variance of the sensing electronics.

The regularizer/prior term R(f) constrains (encourages or weights) the reconstructed image f according to prior knowledge about the image content to be reconstructed. Examples of prior knowledge models include smoothness and self similarity within the image, and similarity to a specific prior image or to a class of prior images. Regularizers enforce smoothness in the reconstructed images by constraining neighboring pixels to have similar values. These types of localized regularizers can be interpreted as a denoising operation, penalizing noise in the reconstructed image. Examples of this type of regularizer include total variation, Huber, FAIR potential, Tikhonov, q-GGMRF, generalized total variation, higher order derivatives (e.g. Laplacian), etc., all familiar to those skilled in the art.

Self-similarity regularizers operate on the principle that the reconstructed image will exhibit regions that are similar to one another. These types of regularizers such as non-local total variation, are based upon the non-local means (patch-based) denoising approach. Prior image constrained compressed sensing (PICCS) enforces similarity between the reconstructed image and a prior image from a previous scan/reconstruction of the object. Dictionary-based regularizers (e.g. K-SVD, as described in an article by Ahron, et al. entitled "K-SVD: An Algorithm for Designing Overcomplete Dictionaries for Sparse Representation" in *IEEE Transactions on Signal Processing*, Vol. 54 No. 11, November 2006) build a prior model of the image using a dictionary learned from a set of training examples (class of prior).

The dictionary-based regularizer is used to enforce similarity between the entries of the dictionary and the reconstructed image. In general, regularizers can be interpreted as providing a denoising operation and are analogous to denoising in image processing.

Figure 1:
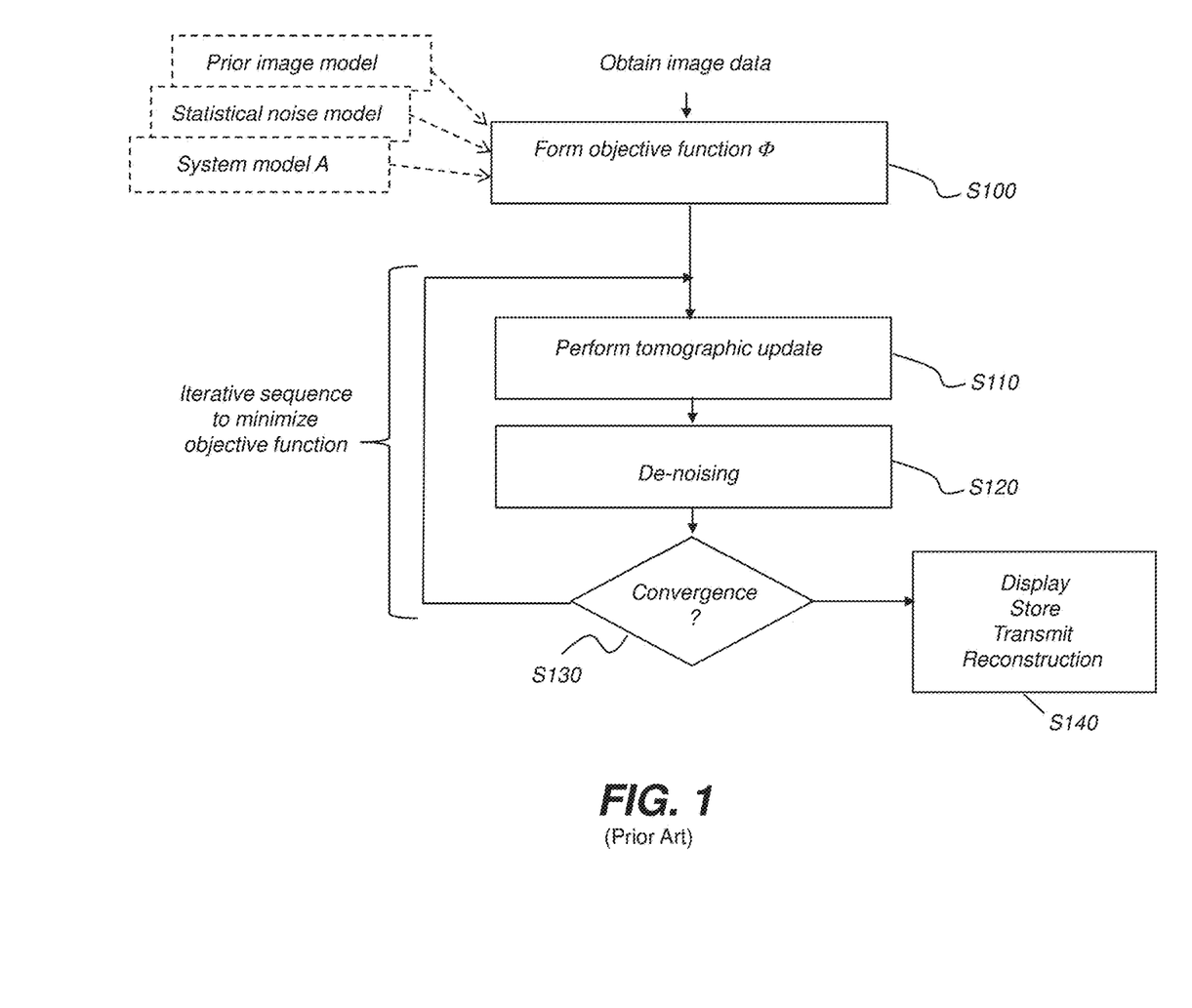
FIG. 1 is a logic flow diagram that shows an iterative sequence for minimizing an objective function used in MBIR processing of image content.

A number of different algorithms can be used for minimizing the objective function $f^*$. One strategy, shown in the logic flow diagram of FIG. 1, is to utilize so-called forward-backwards operator splitting (aka proximal gradient) methods to minimize the objective function. The operator-splitting technique simplifies and improves the computational efficiency of the minimization by splitting the regularizer term and data fidelity term into the following two step iterative algorithm:

$$(i) \; v^{k+1} = f^k - \delta^k A^T W(A f^k - p) \quad \text{(eqs. 5)}$$

$$(ii) \; f^{k+1} \leftarrow \min_{f>0} \arg \left\{ \mu R(f) + \frac{1}{2\delta^k} \|f - v^{k+1}\|^2 \right\}$$

wherein $A^T$ is the transpose of the forward projection matrix A; $\delta$ is a scalar parameter; and k is the iteration index. Value $v^{k+1}$ represents an intermediate reconstructed object at each step in the iteration. The image $f^{k+1}$ represents the regularizer-constrained reconstructed object at each step k in the iteration. Term $\mu R(f)$ indicates varied strength of the preconditioner. The right-most term in the min arg brackets { } is the proximal term. This term encourages the regularizer-constrained reconstructed object $f^{k+1}$ to be close to the intermediate image $v^{k+1}$.

In the above operator-splitting sequence of eqs. 5, shown as perform tomographic update step S110 and de-noising step S120, respectively, in the logic flow diagram of FIG. 1, step (i) depends only on the choice of forward model A and performs a tomographic update that re-enforces fidelity with the captured data from projections p. This is a gradient descent algorithm where the direction of the gradient, $A^T(Af^k-p)$, and a step size $\delta^k$ are used to update the current image $f^k$. Step (ii) depends only on the choice of regularizer and re-enforces the regularizer on the reconstructed object $v^{k+1}$ from step (i). The two steps iterate until a desired solution is obtained, as determined by a test step S130. The reconstructed image content can then be displayed, stored, or transmitted in a data disposition step S140.

Regularization enforces smoothness in the reconstructed images by encouraging or constraining neighboring pixels to have similar values. These types of regularizers can be interpreted as a denoising operation and are analogous to denoising in image processing.

In step (i) of eqs. 5, a voxel independent constant step size $\delta^k$ is used in tomographic update. The global step size $\delta$, applied to each voxel, can be determined empirically, or from the following relationship:

$$0 < \delta < \frac{2}{\|A^T W A\|} \quad \text{(eq. 5.1)}$$

or by the following optimization:

$$\delta^k = \arg\min_{\delta \geq 0} \{ H(f^k - \delta A^T W(A f^k - p)) \} \quad \text{(eq. 6)}$$

wherein H( ) is the data fidelity term given by eq. 2. The optimization problem can be solved approximately by using a 1-D line search method or in closed form given by:

$$\delta^k = \frac{(\nabla H(f^k))^T (\nabla H(f^k))}{(\nabla H(f^k))^T A^T W A (\nabla H(f^k))} \quad \text{(eq. 7)}$$

Conventional iterative reconstruction algorithms are typically fast in terms of low frequency convergence speed but suffer from slow convergence for high frequencies. Preconditioning methods can be used to accelerate the convergence of the tomographic update step. A preconditioner is a matrix operator that approximates the inverse of the Hessian matrix of the cost function. To help speed convergence, preconditioning induces a coordinate transformation which improves the condition number of the matrix, which determines the relative rate of change of a solution. In a CT reconstruction problem, the preconditioner approach accelerates convergence of high frequency data, but can also lead to a reconstructed image with increased non-uniform signal-to-noise properties. Unless the effects of the preconditioner on the signal-to-noise properties of the image are taken into consideration, a spatially constant regularizer algorithm (step (ii) in eqs. 5) can exacerbate the signal to noise non-uniformity.

Using Spatially Varying De-Noising

Recognizing the above-noted shortcomings of conventional MBIR techniques, an embodiment of the present disclosure addresses the need for an MBIR approach that both speeds the convergence rate and improves noise uniformity in the image reconstruction. An embodiment of the present disclosure executes the iterative tomographic reconstruction and regularization sequence outlined above, but modifies this sequence to provide a spatially varying regularizer step; wherein the spatially varying aspect of the regularizer step (ii) is a function of the tomographic reconstruction step (i) preconditioner. The iterative sequence can be expressed as the following iteration:

$$(i) \; v^{k+1} = f^k - \delta M^{-1} A^T W(Af^k - p) \quad \text{(eqs. 8)}$$

$$(ii) \; f^{k+1} \leftarrow \min_{f>0} \arg\left\{\mu R(f) + \frac{1}{2\delta}\|f - v^{k+1}\|_M\right\}$$

wherein M is the preconditioner, an n Voxel×n Voxel matrix.

The updates for each voxel are coupled together by the nondiagonal preconditioner M matrix and lead to nonseparable (or coupled) voxel updates in the tomographic and regularizer update steps.

The simplest preconditioners are diagonal scaling matrices D which lead to separable voxel updates. An embodiment of the current disclosure uses the following iterative sequence:

$$(i) \; v^{k+1} = f^k - \delta D^{-1} A^T W(Af^k - p) \quad \text{(eqs. 9)}$$

$$(ii) \; f^{k+1} \leftarrow \min_{f>0} \arg\left\{\mu R(f) + \frac{1}{2\delta}\|f - v^{k+1}\|_D\right\}$$

By way of example, the following diagonal preconditioners D are useful for providing separable voxel updates in an embodiment of the present disclosure:

$$D = \text{diag}_{ii}\{[H1]_i\} \quad \text{(eq. 10a)}$$

$$D = \text{diag}_{ii}\{[H]_{ii}\} \quad \text{(eq. 10b)}$$

wherein H is the Hessian matrix or an approximate Hessian matrix for the gradient based tomographic update step. Assuming $D_{ii} \neq 0$, the inverse matrix $D^{-1}$ is given by $D^{-1} = \text{diag}_{ii}\{1/D_{ii}\}$. According to another embodiment of the present disclosure, a linear or nonlinear (e.g. square root, squared, etc.) transformation can be applied to the preconditioner matrix D before the spatially varying denoising. These transformations are applied element-wise to preconditioner matrix D.

The method of the present disclosure can combine the algorithm with a momentum function and/or with a Bregman iteration and/or with an ordered subset (OS) approach to further increase the speed of convergence. Momentum functions and Bregman iterations, briefly outlined following, are well known to those skilled in the image reconstruction arts.

Ordered Subset (OS) Approach

The OS method accelerates the updating of the reconstruction image by using sequences of sub-iterations with different subsets of the projection data. The projection data is divided up into N subsets and each sub-iteration computes the voxel updates using only one subset of data. Since each subset of the projection data can be regarded as an approximation to full set of projections, each OS sub-iteration can sometimes be as effective as a full iteration without OS. Therefore, by using N subsets, one can potentially speed up the convergence by a factor of N. The OS method can be applied either to the tomographic update step, as follows:

for $j = 0$ to $N - 1$     (eqs. 11)

$$f_{j+1}^k = f_j^k - \delta D_j^{-1} A_j^T W(A_j f_j^k - p_j)$$

$$v^{k+1} = f_{N-1}$$

$$f_0^{k+1} \leftarrow \min_{f>0} \arg\left\{\mu R(f) + \frac{1}{2\delta}\|f - v^{k+1}\|_D\right\}$$

optionally, the OS method can be applied to both the tomographic and regularizer update steps:

for $j = 0$ to $N - 1$     (eqs. 12)

$$v_j^k = f_j^k - \delta D_j^{-1} A_j^T W(A_j f_j^k - p_j)$$

$$f_{j+1}^k \leftarrow \min_{f>0} \arg\left\{\mu R(f) + \frac{1}{2\delta}\|f - v_j^k\|_{D_j}\right\}$$

$$f^{k+1} = f_{N-1}^k$$

wherein $A_j$, $W_j$, $p_j$, and $D_j$ are the forward system projection model, statistical weights from a weighting matrix, projections, and preconditioner for the jth subset.

Momentum Techniques

Momentum techniques can be used to further accelerate the convergence speed of the disclosed processing. Momentum techniques take advantage of previous updates to contribute to the convergence. Accelerated gradient methods can be considered as momentum methods, in that the step taken at the current iteration depends on the previous iterations, and wherein the momentum increases from one iteration to the next. The following is an example of a proximal gradient version of Nesterov's 1983 momentum method applied to the methods of the current disclosure:

$$(i) \; v^{k+1} = g^k - \delta D^{-1} A^T W(Ag^k - p) \quad \text{(eqs. 13)}$$

$$(ii) \; f^{k+1} \leftarrow \min_{f>0} \arg\left\{\mu R(f) + \frac{1}{2\delta}\|f - v^{k+1}\|_D\right\}$$

$$(iii) \; t_{k+1} = \frac{1 + \sqrt{1 + 4t_k^2}}{2}$$

$$(iv) \; g^{k+1} = f^k + \left(\frac{t_k - 1}{t_{k+1}}\right)(f^k - f^{k+1})$$

wherein $t_1 = 1$.

Unlike gradient descent, accelerated momentum methods are not guaranteed to lead to a monotone decrease in the objective function value. One way of mitigating possible divergence is to restart the algorithm when an increase in the objective function $\Phi(f^{k+1}) > \Phi(f^k)$ is observed. The current iteration is taken as the new starting point which erases memory of previous iterations and resets the momentum back to zero.

The method of the present disclosure can be combined with a Bregman iteration, Bregman operator splitting algorithm, to further accelerate the convergence speed of the current disclosure. The Bregman operator splitting algorithm is given by:

for $i = 1$ to $N$     (eqs. 14)

$$v^k = f^k - \delta D^{-1} A^T W(Af^k - p^k)$$

$$f^k \leftarrow \min_{f>0} \arg\left\{\mu R(f) + \frac{1}{2\delta}\|f - v^k\|_D\right\}$$

$$p^{k+1} = p^k + p - Af^{k+1}$$

wherein $p^0=p$. As shown above, one iteration of the algorithm consists of iterating the current disclosure operator-splitting algorithm a fixed number of iterations followed by a Bregman iteration. The Bregman iteration extracts information from the residual $p-Af^{k+1}$ and adds it back to $p^k$ which is used as the new projection data $p^{k+1}$ in the tomographic update step. Using an excessive number of outer iterations using the Bregman iteration, however, has the potential for introducing high levels of noise into the image, especially when the measurements already contain significant noise.

Figure 5:
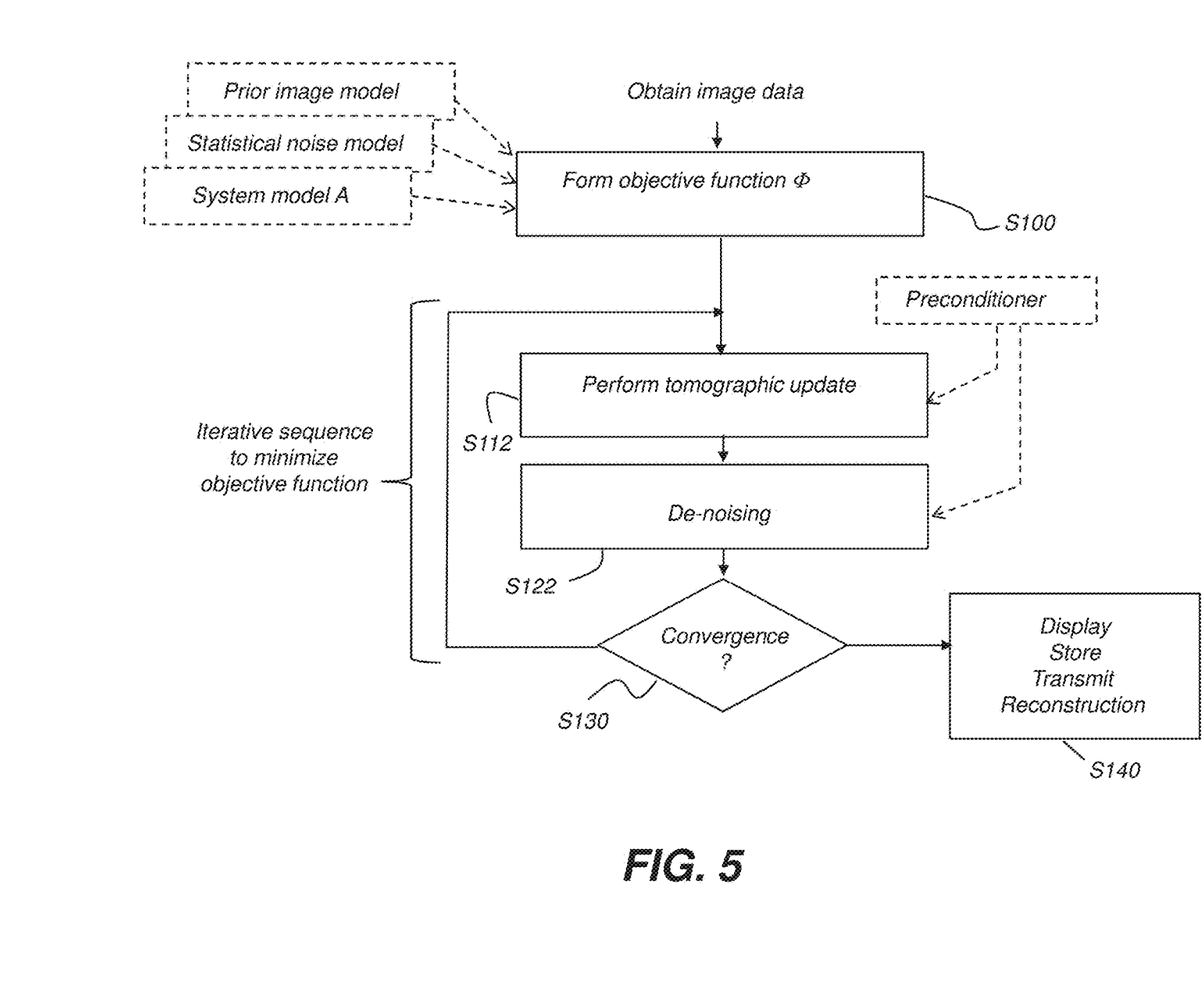
FIG. 5 shows a logic flow diagram with a sequence that applies one or more iterations of a preconditioned gradient base tomography update step followed by a preconditioned driven spatially varying denoising/regularizing step.

The present disclosure has thus far been developed using an operator splitting technique to split the objective function's regularizer (prior model) term and data fidelity (forward model) term into two separate update equations. This can be generalized to develop a framework in which the forward and prior models are decoupled and thus will allow the choice of a wide variety of denoising models with a tomographic forward model. Embodiments of the present disclosure provide one or more iterations of a preconditioned gradient base tomography update step followed by a preconditioned driven spatially varying denoising/regularizing step, as shown in the logic flow diagram of FIG. 5. The overall iteration has two steps:

(i) $v^{k+1}\leftarrow$ precondition gradient based tomographic update step ($f^k$)
(ii) $f^{k+1}\leftarrow$ precondition driven spatially varying denoising/regularizing ($v^{k+1}$)

As shown in the logic flow diagram of FIG. 5, processing begins by forming an objective function $\Phi$ that incorporates an accurate system model A, a statistical noise model, and a prior image model, as shown in form objective function step S100. Using an operator-splitting sequence, a perform tomographic update step S112 uses the system model A, statistical noise model, and a preconditioner in a gradient-based tomographic update of the current volume image reconstruction.

The tomographic update step S112 re-enforces fidelity between the captured data projections p and updated volume image. This can be a gradient descent algorithm wherein the direction of the gradient, $A^T(Af^k-p)$, and a variable step size $\delta$ determined by the preconditioner are used to update the current image $f^k$ to form an intermediate reconstructed image $v^{k+1}$. A subsequent de-noising step S122 also uses the preconditioner to spatially vary the strength of the denoising algorithm. Any type of denoising algorithm can be applied, provided its application is a function of the preconditioner. The preconditioner can determine the strength of the denoising or, for algorithms for which strength is not adjusted, can determine how many iterations are required. Step S122 depends only on the choice of denoiser/regularizer and re-enforces the denoiser/regularizer on the intermediate reconstructed object $v^{k+1}$ from step S112. Step S122 can itself have a number of iterations, as determined by the algorithm used and the preconditioner. The two steps S112 and S122 iterate until a desired solution is obtained, as determined by convergence test step S130. The reconstructed image content can then be displayed, stored, or transmitted in data disposition step S140.

The method of the present disclosure shown in the FIG. 5 sequence and expressed in steps (i) and (ii) above allows a choice from a number of different types of preconditioned tomographic updates and denoising/regularizing algorithms. The denoising/regularizing algorithms may or may not be explicitly formulated as optimization problems as shown, for example, in eq. 9, as long as the denoising can be varied, voxel-to-voxel, as a function of the preconditioner used in the tomographic update step S112.

Examples of preconditioned gradient based tomographic updates that can be used are gradient descent, conjugate gradient, coordinate descent, and algebraic iterative reconstruction techniques based upon weight gradient descent solutions such as algebraic reconstruction technique (ART), simultaneous algebraic reconstruction technique (SART), Cimmino's method for iterative reconstruction, component averaging (CAV), etc.

Examples of a type of regularizer that can be used in the minimization problem of eqs. 9 include total variation, Huber, Tikhonov, G-Generalized Gaussian q-GGMRF, generalized total variation, higher order derivatives (e.g. Laplacian), PICCS, singular value decomposition K-SVD, non-local total variation, etc. The preconditioner matrix D is used to spatially vary the weight between the regularizer and proximal term. These minimization algorithms are typically solved via an iterative process. Alternatively, the spatially varying denoising can be induced by varying the number of update iterations per voxel/pixel of f as a function of the preconditioner matrix D. Thus, the preconditioner can be used to control the number of denoising iterations within the main loop.

Examples of denoising/regularizing algorithms that are not explicitly formulated as optimization problems include bilateral filter, non-local means, BM3D, median, Gaussian, etc. The input to the denoising algorithm is the intermediate reconstructed object $v^{k+1}$ and the output is the reconstructed object $f^{k+1}$ Alternatively, the resulting reconstructed object $f^{k+1}$ can be a weighted combination of the original and the denoised/regularized $v^{k+1}$. For example, the non-local means for the filtering process can be expressed as follows:

$$f(r) = \frac{\sum_{t\in W} w(r,t)v(t)}{\sum_{t\in W} w(r,t)} \qquad (\text{eq. 15})$$

wherein $f(r)$ is the filtered voxel intensity at voxel r and $v(t)$ is the filtered voxel intensity at voxel t. Variable w represents a window (search window) centered at pixel r and w(s,t) is the weight assigned to an individual voxel t within this window when filtering pixel r. The weight is given by:

$$w(r,t) = \exp\left(-\frac{\sum_{\delta\in P} G_\sigma(\delta)[v(r+\delta)-v(t+\delta)]^2}{h^2}\right) \qquad (\text{eq. 16})$$

The weighting is in accord with the similarity between two patches of the same size P centered at pixels r and t. $G_\sigma$ is a Gaussian kernel of variance $\sigma^2$, and $\delta$ represents the relative offsets of pixels inside a patch. h is a constant smoothing parameter used to control the amount of denoising. When using non-local means filtering for the denoising step of the current disclosure, the strength of $h(r)=k\cdot d(r)$ is based upon the value of the preconditioner at voxel r and k is a proportionality constant that serves to tune the denoising strength. d(r) corresponds to a diagonal element of the preconditioner D.

According to an embodiment of the present disclosure, one implementation of a preconditioned gradient-based tomography update step is to use a SART (simultaneous algebraic reconstruction technique) update or an ordered set SART (OS-SART)-like update:

$$v^{k+1} = f^k - \delta D^{-1} V_2 A^T V_1 W(Af^k - p) \quad \text{(eqs. 17)}$$

$$V_1 = \text{diag}_{jj}\left\{\frac{1}{\sum_{i=1}^{N} A_{i,j}}\right\} \quad V_2 = \text{diag}_{ii}\left\{\frac{1}{\sum_{j=1}^{M} A_{i,j}}\right\}$$

wherein $A_{i,j}$ is the i,jth element of matrix A and D is a diagonal matrix given by:

$$D = \text{diag}_{ii}\{[V_2 A^T V_1 WA1]_i\} \quad \text{(eq. 18)}$$

In a suitable implementation of SART, the jth diagonal element of matrix D is the average of the statistical weights that are back projected into a jth voxel.

Figure 2A:
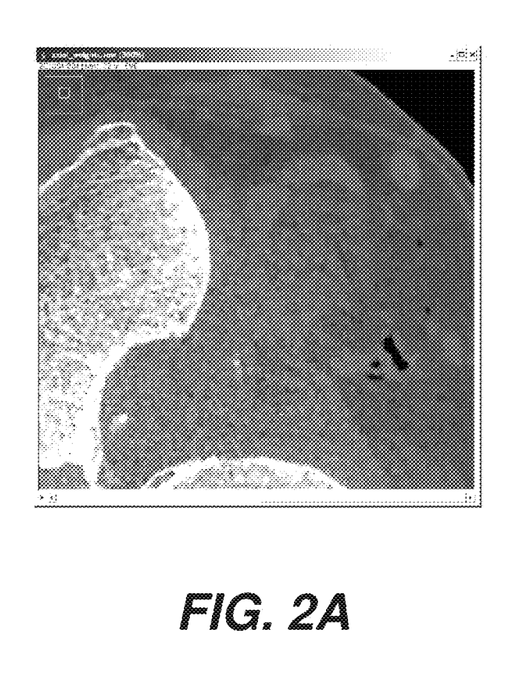
FIGS. 2A and 2B compare results obtained using a fixed, uniform step size with a conventional regularizer against results obtained using a spatially varying regularizer/denoising algorithm.
Figure 2B:
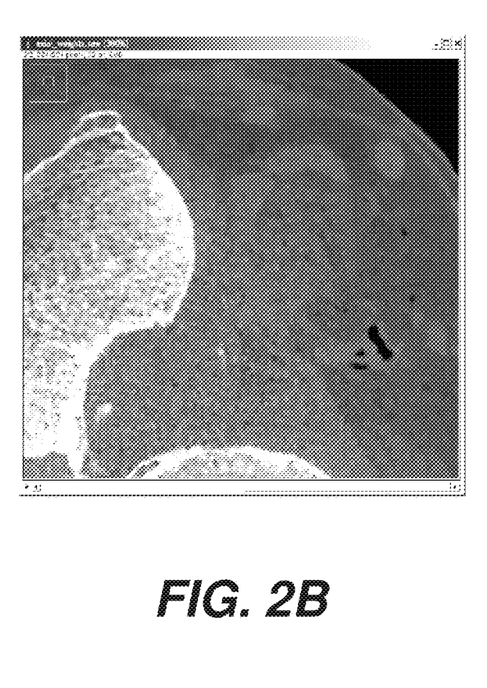

FIGS. 2A and 2B compare results obtained using a fixed, uniform step size with a conventional regularizer, as in FIG. 2A, against results obtained using a spatially varying regularizer/de-noising algorithm as in FIG. 2B.

Figure 3:
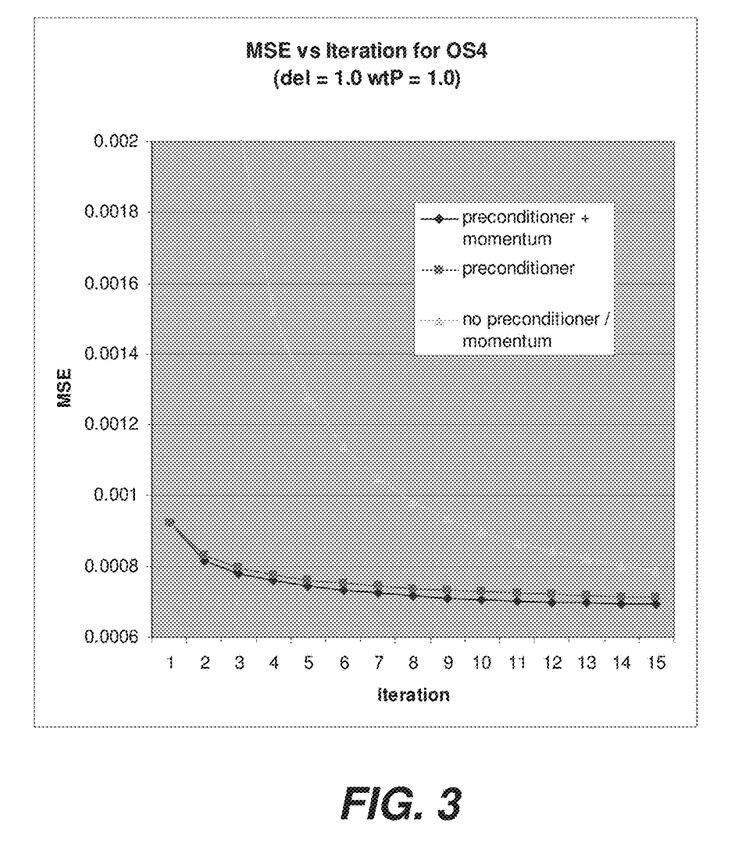
FIG. 3 is a graph that shows mean-squared error (MSE) plotted against number of iterations, with and without a preconditioner.

The graph of FIG. 3 shows mean-squared error (MSE) plotted against number of iterations, with and without a preconditioner.

Figure 4:
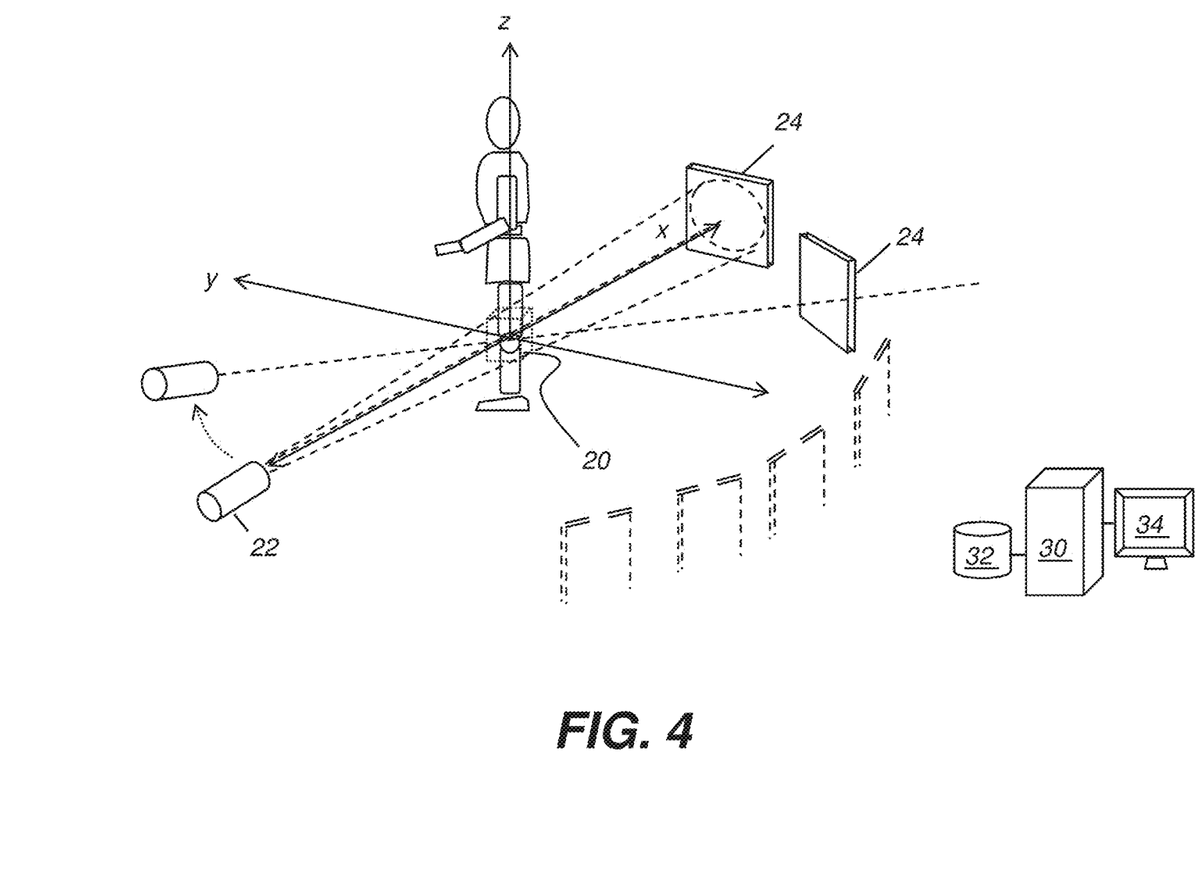
FIG. 4 is a schematic diagram that shows a volume imaging apparatus used for image acquisition and processing.

In order to more fully understand the methods of the present disclosure and the problems addressed, it is instructive to review principles and terminology used for volume image capture and reconstruction. Referring to the perspective view of FIG. 4, there is shown, in schematic form and using enlarged distances for clarity of description, the activity of a conventional cone-beam computed tomography or CBCT imaging apparatus for obtaining the individual 2-D images that are used to form a 3-D volume image. A cone-beam radiation source 22 directs a cone of radiation toward a subject 20, such as a patient or other subject. A sequence of images is obtained in rapid succession at varying angles about the subject, such as one image at each 1-degree angle increment in a 200-degree orbit. A DR detector 24 is moved to different imaging positions about subject 20 in concert with corresponding movement of radiation source 22. FIG. 4 shows a representative sampling of DR detector 24 positions to illustrate how these images are obtained relative to the position of subject 20. Once the needed 2-D projection images are captured in this sequence, a suitable imaging algorithm, as described hereinabove, is used for generating the 3-D volume image. Image acquisition and program execution are performed by a computer 30 or by a networked group of computers 30 that are in image data communication with DR detectors 24. Image processing and storage is performed using a computer-accessible memory 32. The 3-D volume image content can be presented on a display 34.

As can be appreciated by those skilled in the image processing arts, a computer program for iterative volume image reconstruction can be utilized by a suitable, general-purpose computer system, such as a personal computer or workstation that acts as an image processor, when provided with a suitable software program so that the processor operates to acquire, process, and display data as described herein. Many other types of computer systems architectures can be used to execute the computer program of the present disclosure, including an arrangement of networked processors, for example.

The computer program for performing the method of the present disclosure may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present disclosure may also be stored on computer readable storage medium that is connected to the image processor by way of the internet or other network or communication medium. Those skilled in the image data processing arts will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It is understood that the computer program product of the present disclosure may make use of various imaging and related data manipulation algorithms and processes that are well known. It will be further understood that the computer program product embodiment of the present disclosure may embody algorithms and processes not specifically shown or described herein that are useful for implementation. Such algorithms and processes may include conventional utilities that are within the ordinary skill of the image processing and calibration arts. Additional aspects of such algorithms and systems, and hardware and/or software for producing and otherwise processing the images or co-operating with the computer program product of the present disclosure, are not specifically shown or described herein and may be selected from such algorithms, systems, hardware, components and elements known in the art.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for reconstructing a volume image of a subject, the method executed at least in part by a computer, comprising:
   accessing a plurality of projection x-ray images of the subject;
   performing a volume image reconstruction using the plurality of projection x-ray images by iteratively performing:

(1) a tomographic update step, where a gradient based algorithm having a preconditioner is used to update the volume image reconstruction; and (2) a spatially varying denoising step, where the preconditioner is used to spatially vary the strength of a denoising algorithm; and displaying, storing, or transmitting the volume image reconstruction.

2. The method of claim 1 wherein the spatially varying denoising step uses a bilateral filter, non-local mean, or a Gaussian denoising method.

3. The method of claim 1 wherein the tomographic update step uses a simultaneous algebraic reconstruction technique (SART).

4. The method of claim 1 wherein the preconditioner comprises a diagonal matrix.

5. The method of claim 4 wherein a ith diagonal element of the diagonal matrix D is the average of a statistical weights that are back projected into a ith voxel by the volume image reconstruction.

6. The method of claim 1 further comprising using momentum function to accelerate the tomographic update step.

7. The method of claim 1 wherein the preconditioner is used to determine the number of iterations of the spatially varying denoising step.

8. The method of claim 1 wherein performing the spatially varying denoising step comprises using an optimization function.

9. The method of claim 1, wherein an ordered subset method is applied to the tomographic update step, the denoising step, or both the tomographic update and denoising steps.

10. The method of claim 1 wherein the tomographic update step uses an algorithm taken from the group consisting of gradient descent, conjugate gradient, coordinate descent, algebraic reconstruction technique, simultaneous algebraic reconstruction technique, Cimmino's method for iterative reconstruction, and component averaging.

11. The method of claim 1 further comprising using sequences of sub-iterations with different ordered subsets of the plurality of projection x-ray images.

12. The method of claim 1, wherein the denoising step includes using a spatially varying regularizer to denoise the image reconstructed in the tomographic update step.

13. The method of claim 12, wherein the regularizer is at least one of a total variation, Huber, Tikhonov, q-GGMRF, FAIR potential, generalized total variation, higher order derivatives, PICCS, K-SVD, non-local total variation.

14. The method of claim 1, wherein the denoising step includes using a spatially varying denoising filter to denoise the image reconstructed in the tomographic update step.

15. The method of claim 14 wherein the denoising filter is at least one of a bilateral filter, non-local mean, BM3D, median, or a Gaussian denoising method.

16. The method of claim 1, wherein the reconstruction comprises a Bregman iteration step or a momentum step.

17. The method of claim 1, wherein the tomographic update step uses a statistical noise model incorporating captured photon statistics.

18. The method of claim 1, wherein the tomographic update step uses preprocessing steps for one or more of detector response and normalization, scatter and beam hardening correction, and denoising of the measured projections.

19. A method for reconstructing a volume image of a subject, the method executed at least in part by a computer, comprising:

accessing a plurality of projection x-ray images of the subject;

performing a volume image reconstruction using the plurality of projection x-ray images by iteratively performing:

(1) a tomographic update step, where a simultaneous algebraic reconstruction technique and a preconditioner is used to update the volume image reconstruction; and (2) a spatially varying denoising step, where a spatially varying denoising algorithm is a function of the preconditioner; and displaying, storing, or transmitting the volume image reconstruction.

20. A method for reconstructing a volume image of a subject, the method executed at least in part by a computer, comprising:

accessing a plurality of projection x-ray images of the subject;

performing a volume image reconstruction using the plurality of projection x-ray images by iteratively performing:

(1) a tomographic update step, where a gradient based algorithm having a preconditioner is used to update the volume image reconstruction;

(2) an acceleration step, where a momentum function is used to accelerate the tomographic update step; and (3) a spatially varying denoising step, where a spatially varying denoising algorithm is a function of the preconditioner; and displaying, storing, or transmitting the volume image reconstruction.

* * * * *